United States Patent [19]

Hankinson et al.

[11] Patent Number: 4,919,881
[45] Date of Patent: Apr. 24, 1990

[54] REACTOR INTERNALS THROUGH-HOLE GRAPPLE

[75] Inventors: Michael F. Hankinson, Monroeville; Kenneth J. Swidwa, North Versailles; Robert B. Salton, Plum Borough, all of Pa.

[73] Assignee: Westinghouse Electric Corp., Pittsburgh, Pa.

[21] Appl. No.: 215,116

[22] Filed: Jul. 5, 1988

[51] Int. Cl.⁵ .............................................. G21C 19/20
[52] U.S. Cl. ..................................... 376/260; 376/262; 376/268; 294/86.25
[58] Field of Search ............... 376/261, 271, 268, 262, 376/260; 294/906, 86.25, 94

[56] References Cited

U.S. PATENT DOCUMENTS

| | | | |
|---|---|---|---|
| 3,638,988 | 2/1972 | Brown | 294/86.25 |
| 4,093,294 | 6/1978 | Taylor | 294/86.25 |
| 4,236,966 | 12/1980 | Savin et al. | 376/271 |
| 4,236,967 | 12/1980 | Batjukov et al. | 376/271 |
| 4,244,616 | 1/1981 | Buchalet | 294/86 A |
| 4,643,868 | 2/1987 | Bollinger | 376/262 |
| 4,663,114 | 5/1987 | Cransac et al. | 376/271 |
| 4,747,997 | 5/1988 | Boatwright | 376/261 |

*Primary Examiner*—Daniel Wasil
*Attorney, Agent, or Firm*—Michael G. Panian

[57] ABSTRACT

A remotely operated device which attaches to an existing internals lifting rig to safely lift and transport nuclear reactor internals structures. The device includes a grapple assembly uniquely formed to maximize the effective bearing surface of an annular shoulder disposed on the grapple assembly to engage the internal structure. The annular shoulder comprises a first outer diameter, the annular shoulder defining a second outer diameter disposed thereabove. The grapple assembly comprises a plurality of fingers circumferentially disposed about an actuator rod which has a diameter essentially equal to a first inner diameter of the grapple assembly. The lower end of the grapple assembly has a second inner diameter smaller than the first and axially adjacent to the annular shoulder. In order to maximize the bearing surface, the fingers of the grapple assembly are formed such that the first inner and outer diameters are machined with respect to a first axis, whereas the second inner and outer diameters are formed with respect to a second axis parallel to the first. These machining axes are offset from each other by a distance which is equal to the desired amount of radial expansion of the fingers. This uniquely formed grapple device thus has a bearing surface 30 to 40 percent greater than that achieved by prior art devices.

41 Claims, 5 Drawing Sheets

REACTOR INTERNALS THROUGH-HOLE GRAPPLE

TECHNICAL FIELD

The invention relates to equipment utilized in the servicing of nuclear reactor power plants, and more particularly to an internals through-hole grapple device for lifting and transporting nuclear reactor internals structures.

BACKGROUND OF THE INVENTION

During various maintenance procedures for a typical nuclear reactor, such as refueling of the reactor core or inspection, the internals structures, which typically take the form of both upper and lower internals, are lifted or removed entirely from within the reactor vessel. Since an operating nuclear reactor generates an irradiated environment, which is safely protected within a typically concrete containment building, borated water or other shielding media is maintained over the irradiated components normally maintained within the interior of the reactor pressure vessel. Power plant personnel during these procedures are usually positioned on an operating deck, which can be about 6 meters (20 feet) above the level of the reactor pressure vessel, to minimize radiation exposure during maintenance procedures. The removal of the internals is often accomplished by a remotely operated lifting rig which is manipulated by the plant's overhead polar crane.

The reactor internals lifting rig is typically a circular structural frame containing bolts which thread into corresponding threaded holes within a radial flange of the reactor internals structures. This is generally done manually through the use of three bolts having long torque tubes which extend upward from the lifting rig to the operating deck. The lifting rig is aligned over the internals by means of bushings on the frame which engage guide studs threaded into the vessel flange after removal of the vessel closure head stud bolts and the vessel closure head.

Several problems may arise in the use of such a prior art device. Over time, during the long operating life of a nuclear power plant, numerous refueling and maintenance operations are normally performed. During these operations the threaded holes within the internals structures can inadvertently become damaged. One possible explanation for this is the fact that personnel must operate from such a remote location. It can be quite difficult, especially because of the presence of the shielding water, to visually verify when the threaded bolts are in the proper position to be threadingly engaged within the internals. Additionally, over torquing of the bolt can cause damage to the threaded sections of the internally threaded holes. Such accidental distortion of the threads can render the conventional lifting rig unusable for the lifting and/or transporting of nuclear reactor internals structures.

DISCLOSURE OF THE INVENTION

It is therefore an object of the present invention to provide a reactor internals lifting device which obviates the need to use internally threaded holes in the reactor internals to permit easier engagement therewith.

It is another object of the present invention to provide a remotely operated device which will indicate to the remote operator when the lifting rig is properly engaged with the reactor internals, when direct inspection of the engagement mechanism is impractical.

The above objects are obtained by the present invention, according to which, briefly stated a reactor internals through-hole grapple device is provided for lifting and transporting structures which have a radial flange thereon including a top and bottom surface with a hole therebetween; the grapple device having a retracted position and expanded position. The device includes an actuator rod and a plurality of fingers circumferentially disposed about the actuator rod. The fingers cooperate so as to form a first inner diameter essentially equal to that of the actuator rod. A tapered transition zone leads to a second inner diameter smaller than the first. The fingers include an annular shoulder on the outer surface, adapted to contact one of the surfaces of the structure when in the expanded position. The annular shoulder includes a first outer diameter which is no larger than the hole when in the retracted position. The annular shoulder thereby defines a second outer diameter on the fingers which is smaller than the first, and being generally concentric with the first inner diameter. The first inner diameter and the first outer diameter are formed with respect to a first axis; the second inner diameter and the second outer diameter are formed with respect to a second axis parallel to the first. The respective axes are offset by a predetermined distance. The device is expanded by translation of the actuator rod in order to contact the first inner diameter to thereby radially expand the fingers such that the second outer diameter is essentially equal to that of the hole.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENT

Figure 1A:
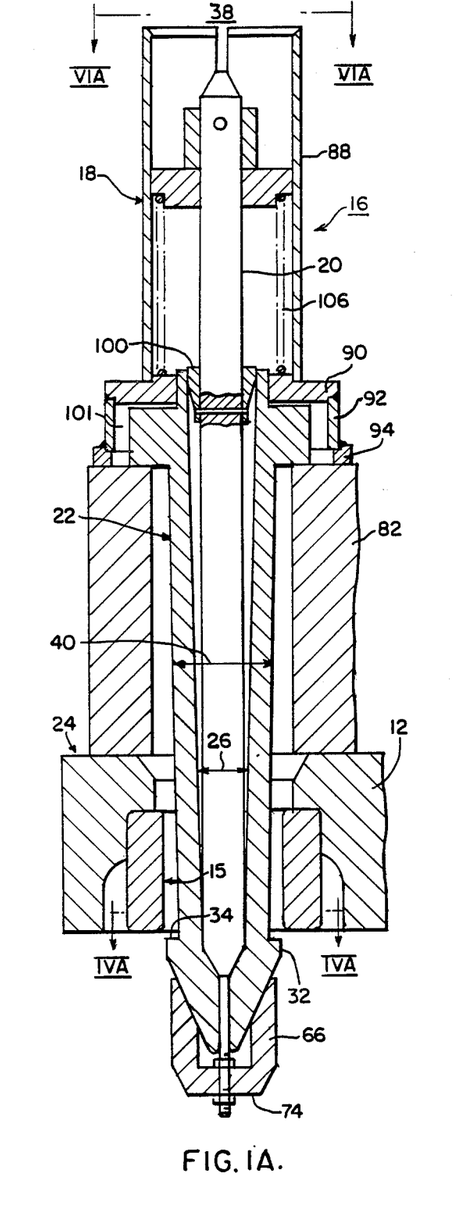
FIGS. 1A and 1B are sectional, side-elevational views of the device of the present invention, showing both the retracted, 1A, and expanded, 1B, positions.
Figure 1B:
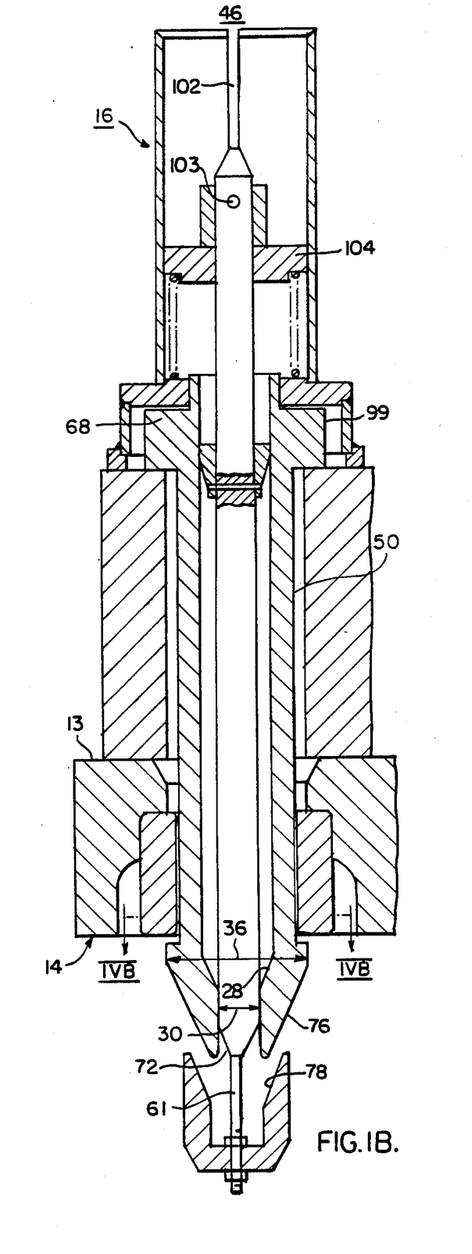
Figure 8:
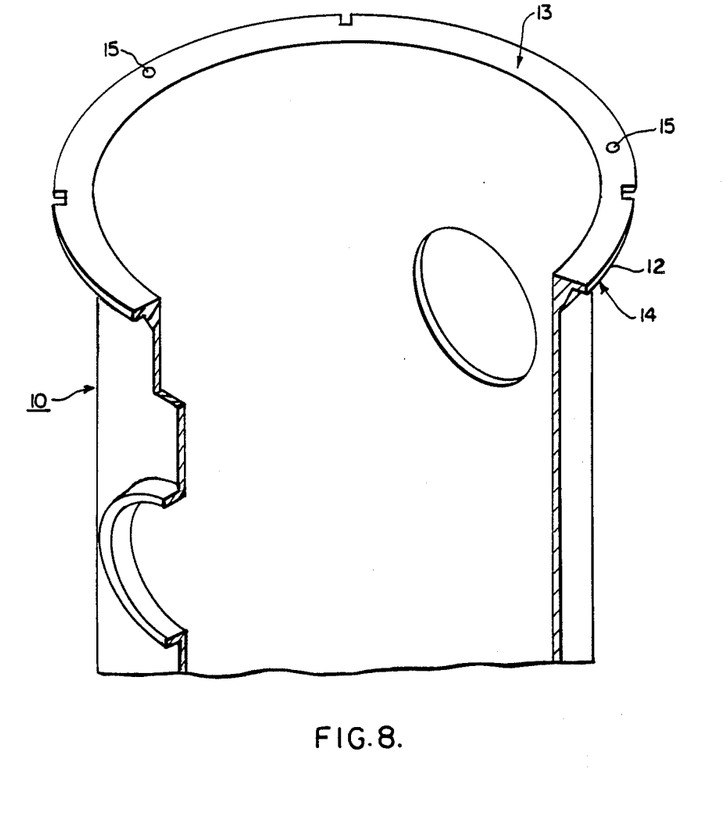
FIG. 8 is a partial, sectional side-elevational view of a lower internals structure of a nuclear reactor vessel.

A typical nuclear pressurized water reactor includes an upper internals structure and a lower internals structure. One design of such a lower internals structure is shown partially in FIG. 8. The lower internals structure 10 includes on its upper end a radially outwardly directed flange 12 having a top 13 and bottom 14 surface, and which typically includes three threaded holes 15 therebetween. Among other things, these holes 15 are used for threadingly engaging a reactor internals lifting rig for lifting and transporting the internals from the pressure vessel (not shown). Since these internally threaded holes 15 can be damaged in the course of maintenance procedures performed during the life of the reactor, the reactor internals through-hole grapple device, shown generally in FIG. 1, was designed.

The through-hole grapple device, generally designated at 16, includes a housing 18 which provides a convenient means to attach the grapple device 16 to the existing lifting rig. This is particularly important for applications in facilities which have been operating over an extended period of time, the components of which have thus become irradiated and it is desirable to use the existing lifting rig. The housing 18 will be more fully described hereinafter. The grapple device or assembly 16 is comprised of an expanding or actuating means, preferably an actuator rod 20, and an expander member 22 having a generally circular cross-section disposed about the actuator rod 20. When so oriented about the actuator rod 20 one end, i.e., the lower end 24 in the Figure, of the expander member 22 has a first inner diameter 26 essentially equal to the diameter of the actuator rod 20. Within the expander member 22 a tapered transition zone 28 axially adjacent to and disposed below the first inner diameter 26 leads to a second inner diameter 30 which is smaller than the first inner diameter 26. The expander member 22 has an annular shoulder 32 on its outer surface which has an upper surface 34 adapted to contact the bottom surface 14 of the reactor internals structure flange 12 when the expander member 22 has been radially expanded, as will be more fully described hereinafter, in order to lift the reactor internals 10. The annular shoulder 32 is disposed at an axial location which is adjacent to the transition zone 28 and has a first outer diameter 36 which is no larger than the diameter of the threaded hole 15 when the device is in a retracted position, generally designated at 38 in FIG. 1A, so that it can be inserted through the hole 15. The annular shoulder 32 thereby defines a second outer diameter 40 on the expander member 22 which is smaller than the first outer diameter 36, the second outer diameter 40 being axially adjacent to the first inner diameter 26 (shown vertically above the first outer diameter 36 in FIG. 1), and generally concentric therewith.

Figure 3:
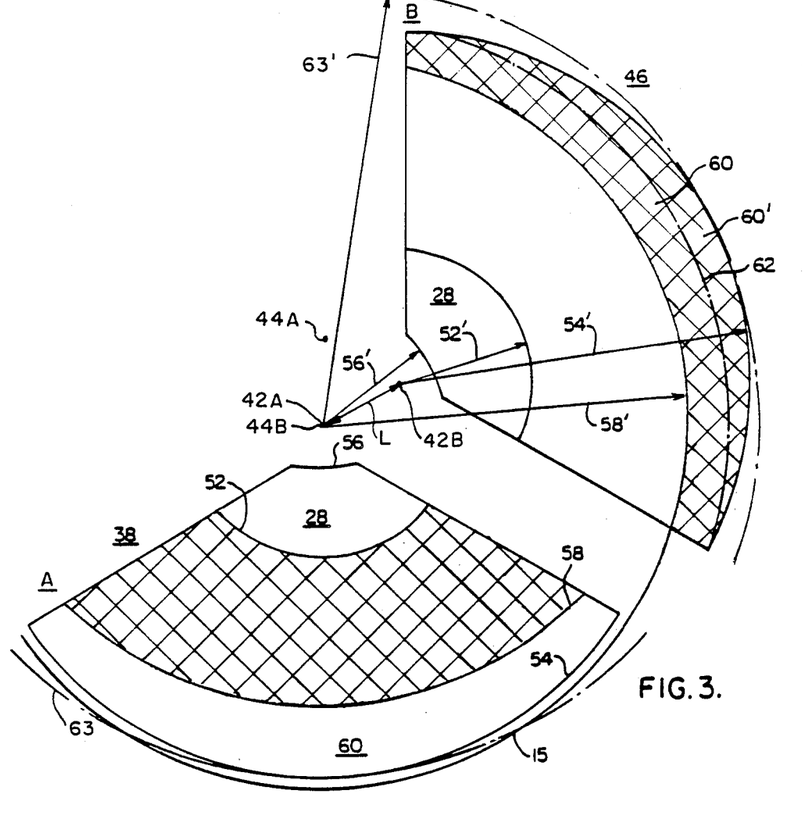
FIG. 3 is a top view of identical fingers of the present invention, the one finger on the left-hand side of the drawing being in the retracted position and the other on the right-hand side of the drawing being in the expanded position.

The first inner diameter 26 and the first outer diameter 36 of the expander member 22 are formed with respect to a plurality of first axes, generally designated at 42, as can be seen in FIG. 3. The second inner diameter 30 and the second outer diameter 40 of the expander member 22 are formed with respect to a second axis, generally designated at 44, which is offset from the first axis 42 by a predetermined distance L. Preferably this predetermined offset distance L is essentially equal to the amount of radial expansion of the expander member 22, for reasons which will more readily become apparent. In order to be secured to the internals 10, the assembly 16 is expanded to an expanded position 46 (FIG. 1B) by translation of the actuator rod 20 (downward in the figure) so that the actuator rod 20 contacts the second inner diameter 30 to thereby radially expand the expander member 22 such that the second outer diameter 40 thereof is expanded to be essentially equal to the diameter of the hole 15. In this configuration, the annular shoulder 32 of the expander member 22 is radially expanded such that its upper surface 34 will contact the bottom surface 14 of the flange 12 of the lower internals 10.

Figure 2:
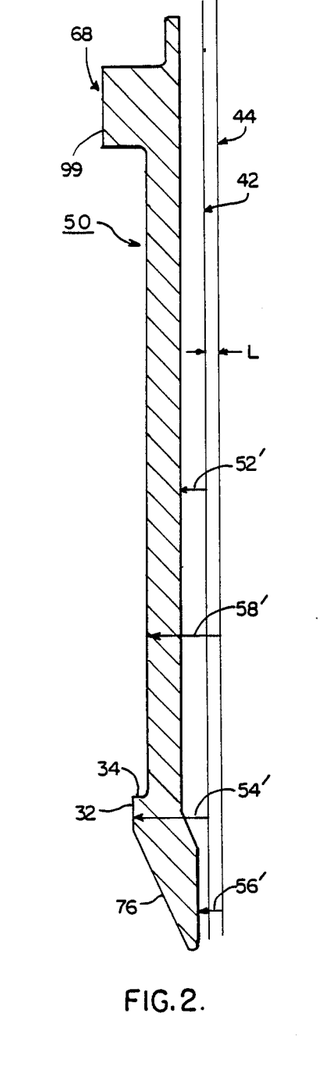
FIG. 2 is a side elevational view of one of the fingers of the present invention.

The expander member 22 is preferably comprised of a plurality of circumferentially disposed fingers 50, preferably three, which are circumferentially disposed about the actuator rod 20, or other suitable actuating means, to thereby form the generally circular cross-section. Furthermore, with reference to FIG. 2, each grapple finger 50 comprises a first inner arc segment 52 and a first outer arc segment 54 which are formed with respect to the first axis 42, and a second inner arc segment 56 and second outer arc segment 5S which are formed with respect to the second axis 44. When circumferentially disposed about the actuator rod 20, the fingers 50 cooperate such that the plurality of first inner arc segments 52 form the first inner diameter 26, the first outer arc segments 54 form the first outer diameter 36, the second inner arc segments 56 form the second inner diameter 30, and the second outer arc segments 58 combine to form the second outer diameter 40.

The radius, 52' of the first inner arc segment 52 is greater than that 56' of the second inner arc segment 56, whereas the radius 58' of the second outer arc segment 58 is greater than that 54' of the first outer arc segment 54 by an essentially equal amount; the radius 58' of the second outer arc segment 58 being essentially equal to that of the hole 15. With such an offset machining of the outside diameters at a point where the internals are contacted, a maximum bearing area 60 is provided for the lifting of the internals structure 10. This makes optimum use of the very limited area available for lifting and radial expansion of the fingers 50 of the grapple device 16. For a typical reactor lower internals structure 10, which typically has a plurality of threaded holes 15 designed to have a radius of about 42.75 mm (1.683 in.), the approximate dimensions for each finger 50 are summarized in Table 1.

TABLE 1

|  | Radius |
| --- | --- |
| First inner arc segment 52 | 15.88 mm (0.625 in) |
| Second inner arc segment 56 | 14.29 mm (0.5625 in) |
| First outer arc segment 54 | 40.36 mm (1.589 in) |
| Second outer arc segment 58 | 41.94 mm (1.651 in) |
| Actuator rod 20 | 15.88 mm (0.625 in) |
| Shaft 61 | 6.35 mm (0.250 in) |
| Offset of axes L | 9.53 mm (0.375 in) |

These dimensions are chosen for a typical internals structure 10 with threaded holes 15 therethrough having the above-mentioned radius, and it is to be understood that the invention is not limited thereto. The first outer arc segment 54 radius of the finger 50 is chosen so as to provide clearance for the device as it is inserted through the hole 15 on the flange 12 of the internals 10, such clearance being desirable since work must be done from a remote location. The radius of the second outer arc segment 58 is chosen to be essentially equal to the radius of the hole 15; again, a slight difference may be allowed for clearance, since the hole 15 may not be of the exact radius due to repeated operation over time.

The first outer arc segment radius 54', which forms the first outer diameter 36 of the annular shoulder 32 of the grapple device, is preferably machined from the first axis 42, also referred to as the retracted axis. The second outer arc segment radius 58', which forms the second outer diameter 40, is formed with respect to the second axis 44, also referred to as the expanded axis. The expanded axis 44 is offset from the retracted axis 42 by an amount which is essentially equal to the radial expansion of the device from the retracted 38 to the expanded position 46, which in this example, is about 9.53 mm (0.375 in.). The second inner radius 56' which forms the second inner diameter 30 is essentially equal to the radius of a smaller shaft 61 on the end of the actuator rod 20 when in the retracted position. The first inner diameter 26 is greater than the actuator rod diameter due to the fact that the first inner radius 52' is machined from the retracted axis 42, so that when in the retracted position 38 the finger 50 will be collapsed about the actuator rod 20 such that the grapple assembly 16 will readily pass through the threaded hole 15. This is so because the operating axis of the tool is the expanded axis 44.

Figure 4A:
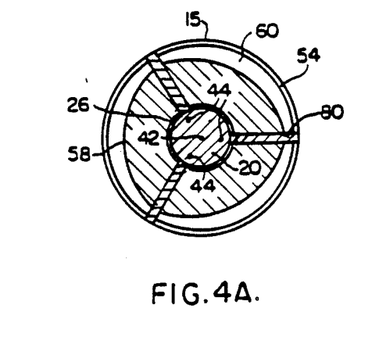
FIGS. 4A and 4B are side-by-side views of the grapple fingers of the present device taken along the line IV—IV of FIGS. 1A and 1B, FIG. 4A being the retracted position and FIG. 4B being the expanded position.
Figure 4B:
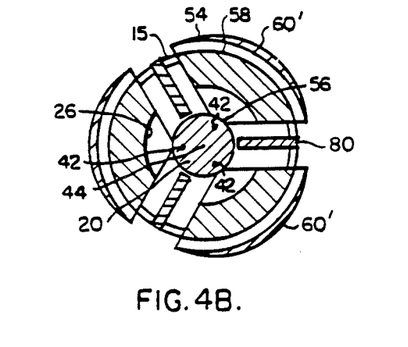

The use of the offset axes 42, 44 for machining can be seen more clearly with reference to FIG. 4: FIG. 4A shows the device in the retracted position 38, whereas FIG. 4B shows the device in the expanded position 46. The expanded axis 44 is used as the centerline for the construction and operation of the overall tool, since the expanded position 46 is the effective operating position for lifting and transporting the internals, structure 10. If the first outer arc segment radius 54' was formed with respect to the expanded axis 44 (as represented by arc segment 63 having radius 63', as shown in FIG. 3), the dimension of the first outer arc segment 54 of the finger 50 would be greater than that of the hole 15. The second outer arc segment radius 58' is chosen to be equal with that of the hole 15 so that when the tool is in the expanded position 46, as shown in FIG. 4B, the second outer diameter 40 is fully expanded into contact with the inside surface of the hole 15. Thus using the retracted axis 42 for the machining of the first outer diameter 36 of the annular shoulder 32 maximizes the available bearing surface 60 for the grapple assembly 16. If the retracted axis 42 were used for machining of the second outer diameter 40, the fingers 50 would not be expanded out to the diameter of the hole 15 for a maximum radial increase. Likewise, using the expanded axis 44 for the machining of the second inner diameter 30 allows for a larger expansion of the fingers 50, than if using the retracted axis 42. The second inner arc segment radius 56', and consequently the second inner diameter 30, is equal to the radius and diameter of the actuator rod 20 when in the expanded position 46 to allow for maximum radial expansion of the fingers 50. Such an offset machining technique can increase the available bearing surface area 60 of the upper surface 34 of the annular shoulder 32, over conventional machining techniques, by about 30 to 40 percent, as shown by dashed line 62 in FIG. 3B.

When in the retracted position 38 (FIG. 4A), the first outer diameter 36 of the annular shoulder 32 is essentially circular so as to facilitate insertion of the grapple device through the hole 15. In other words, the annular shoulder 32 is generally concentric with the diameter of the hole. When in the expanded position 46 (FIG. 4B), it is the second outer diameter 40 that is essentially circular, or concentric with the diameter of the hole 15. Hence, when the fingers 50 are radially expanded the fullest possible measure, as determined by the diameter of the hole 15, the bearing area 60 that is provided for is larger than is possible with conventional machining about a single axis. The first outer diameter 36 of the annular shoulder 32 is expanded outward beyond a circular or concentric orientation with respect to the diameter of the hole. The center of the first outer arc segment 54 is further away from the center of the hole 15 than the ends, as shown by line 62, thus giving rise to the increase in bearing area 60' than would otherwise be provided by a conventional formation/machining of the fingers 50. Furthermore, since each finger is formed with respect to two separate and parallel axes, 42, 44, the assembled device essentially has four axes from which the tool is constructed. Each finger 50 shares the common second or expanded axis 44, which also operates as the centerline of the tool, as well as the centerline of the hole. Additionally, each finger 50 includes a distinct first or retracted axis 42. Thus, the tool has a plurality of separate and parallel axes, the exact number thereof dependent upon the number of finger segments utilized. For example, by way of explanation, if the device comprised four fingers, it would include five separate and parallel axes: the common second or expanded axis, plus a separate first or retracted axis for each of the four fingers. Thus, at any axial cross-section (as in FIG. 4), the tool, in the preferred embodiment, has four centerpoints lying in a common radial plane, the centerpoints corresponding to the machining axes of the individual fingers. It should be pointed out that FIGS. 4A and 4B represent the preferred embodiment for the invention, and that the offset axes 42, 44 may not necessarily align as shown when in the retracted 38 and expanded 46 positions.

Figure 5:
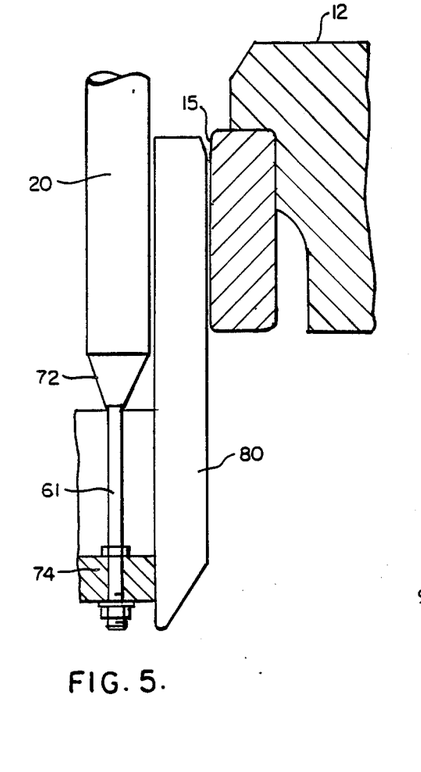
FIG. 5 is a partial sectional side-elevational view of a guide vane of the present invention.

Associated with the bottom of the grapple device 16 is a generally cylindrical finger cup 66 which provides a method of retracting the fingers 50 so that the tool can move in and out of the hole 15. Due to the ratio of finger length to radial dimensions, it can be difficult to retract such fingers 50 at their upper end 68, which is a common difficulty in many prior art gripper designs. The finger cup 66 serves the function of collapsing the fingers 50 as well as providing a tapered surface to facilitate installation into and through the internals 10. The finger cup 66 is secured to the lower end of the actuator rod 20 which includes the shaft 61 attached to the end thereof so as to be concentric with the second inner diameter 30 of the fingers 50. The diameter of the shaft 61 is essentially equal to the second inner diameter 30 of the tool when in the retracted position 38. The shaft 61 is formed on the actuator rod 20 and has a second transition zone 72 therebetween which is disposed to cooperate with the first tapered transition zone 28 of the finger segments 50 when in the retracted position 38. The finger cup 66 is secured to the bottom end of the shaft 61, such as by a bolt or other similar securement means well known in the art. The generally cylindrical cup 66 has an outer diameter which is equal to the first outer diameter 36 of the annular shoulder 32 of the fingers 50. The base 74 of the finger cup 66 is beveled to facilitate insertion through the hole 15. The finger cup 66 is disposed about the lower end 24 of the grapple device 16 so as to hold the fingers 50 in the retracted position 38 and to provide for easy passage through the hole 15 of the internals structure 10 to be lifted. Preferably the outside diameter of the finger cup 66 is somewhat smaller than the diameter of the hole 15, wherein the first outer diameter 36 formed by the fingers 50 is constricted in order to facilitate insertion through the internals. The lower end of the fingers 50 axially adjacent to and below the annular shoulder 32 is tapered radially inwardly to form a conical end portion 76. Likewise, the inside surface of at least the upper portion of the finger cup 66 is similarly tapered and has a radially outwardly directed shape 78 conforming to the conical end portion 76 of the fingers 50. This facilitates sliding engagement between the fingers 50 and the finger cup when expanding and retracting the grapple device 16. Secured to the inside of the finger cup such as by welding, are a plurality of guide vanes 80, preferably three. The guide vanes 80 are secured to the finger cup 66 so as to occupy the radial position between each finger 50. The function of these guide vanes 80, in cooperation with the finger cup 66, is to assure proper disengagement of the top surface of the annular shoulder 22 of the grapple device 16 from the internals structure flange 12. The vanes 80 are sized such that their length does not allow them to exit the internally threaded hole 15 when the actuator rod 20 is manipulated downward to radially expand the device 16. This is shown in FIG. 5. By not exiting the hole 15, they act similar to guide studs upon the retraction of the grapple device 16 to center the fingers 50 in the hole 15. This assures that the retracted fingers 50 will not hang up on the bottom or surface 14 of the flange 12 and will be fully retracted so that they will be less in diameter than the hole 15 to facilitate removal of the grapple device 16.

Figure 6A:
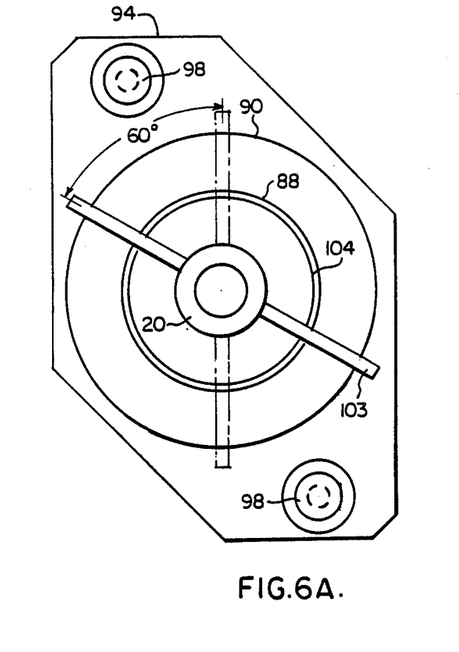
FIGS. 6A and 6B relate to the view of the device taken along the line VI—VI of FIG. 1A.
Figure 6B:
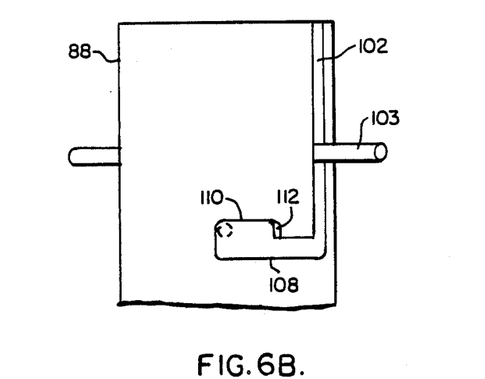
Figure 7:
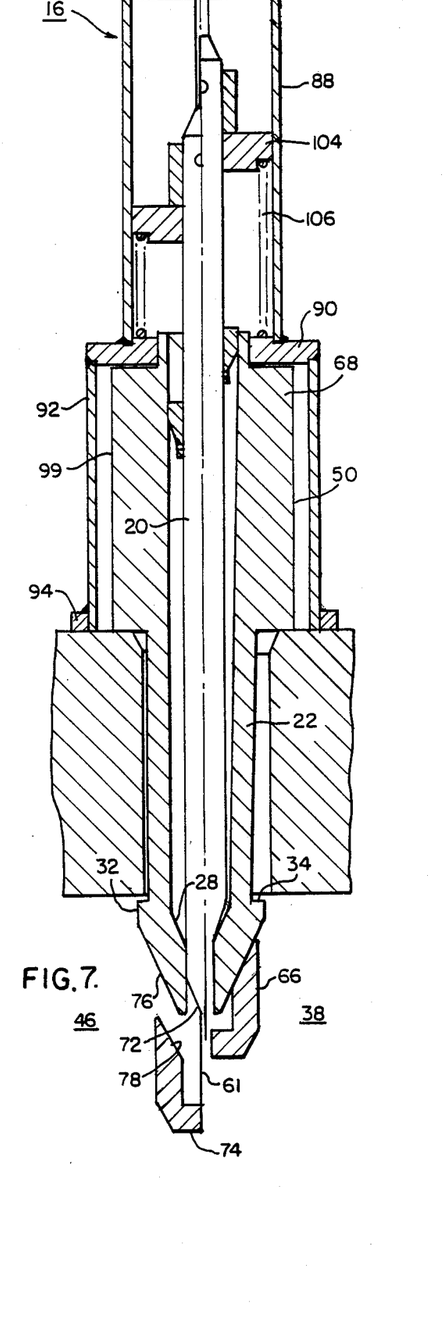
FIG. 7 is an alternative embodiment of the present invention.

On the upper end of the grapple device 16 and disposed about the actuator rod 20 is a generally cylindrical housing 18. The vertically oriented housing 18 is adapted to provide a convenient means for attaching the grapple device 16 to the structural frame of an existing lifting rig, shown in phantom in FIG. 1 at 82, such lifting rigs being well known in the art. The housing 18 is generally comprised of a generally cylindrical body 88 which is joined at its lower end to a collar 90, such as by welding. Depending from the collar 90 is a vertically oriented tubular spacer 92, which is then joined to a base plate 94 having an opening 96 therethrough. The base plate 94, as seen in FIG. 6A, is secured to the existing lifting rig 82 by means of two bolts 98 threadingly engaged with the frame, the bolts 98 are preferably disposed diagonally with respect to each other. The bolts 98 provide required resistance to tension, shear, bending and torsional loads on the tool. Additionally, the housing 18 captures the fingers 50 within the tool, permitting easy assembly of the grapple device 16 itself and its assembly to the lifting rig 82. To help center the fingers 50, the upper end thereof includes a flanged member 99. A wedge member 100 is secured to the actuator rod 20 to keep the flanged member 99 engaged within the annular space 101 defined between the collar 90 and the lifting ring 82; or, if the lifting rig 82 is not used, between the collar 90 and the structure to be lifted (see FIG. 7).

The vertical body of the housing 18 has at least one, and preferably two J-slots 102, on opposing sides thereof which are cut into the cylindrical body 88 and provide a locking means for controlling the actuation of the fingers 50 as well as for visually verifying that the fingers are fully engaged, before lifting of the tool and the internals structure 10 is effected. A pin 103, which is secured to the top of the actuator rod 20 and perpendicular thereto, is disposed so as to slide within the J-slots 102. A flange 104 secured to the top of the actuator rod 20 disposed at about the same location as the pin 103, is biased by means of a spring 106 between the actuator rod flange 104 and the collar 90 of the housing 18. The spring 106 biases the actuator rod 20 upward with respect to the collar 90. In order to lock the tool in the expanded position 46, the actuator rod 20 is pushed downwards by means of the pin 103 until each end of the pin 103 reaches the bottom 108 of the respective J-slot 102, and are then rotated approximately 60° to lock the pin 103 in the smaller upwardly extending leg 110 of the J-slot 102. Since this housing 18, pin 103 and associated J-slots 102 are disposed on the tool at its upper end 68, it is readily visually accessible by the operator. Alternatively, the locking means may take the form of two pins, one each secured to opposing sides of the actuator rod and slidable within a respective J-slot.

This visual locking feature is important in applications where relatively extreme remote actuation is required, and where direct inspection of the engagement surface is impractical. In order to turn the actuator rod 20 horizontally into the locked position, the J-slots 102 are positioned on the housing 18 and cooperate with the ends of the pin 103 such that they require that the actuator rod 20 be in the fully down or expanded position 38. In turn, the actuator rod 20 cannot come full down until the fingers 50 are fully spread or expanded under the flange 12 of the internals structure 10 and the hole 15. Preferably, the travel of the actuator rod 20, as in this example, is about 5 cm (2 in). This ensures that a sufficient length of the actuator rod 20 engages the second inner diameter 30 of the fingers 50 so that they may be fully expanded and the maximum possible bearing surface of the annular shoulder 32 will engage the bottom surface 14 of the reactor internals flange 12 when the tool is lifted. Also, the guide vanes 80 associated with the finger cup 66 are sized so as not to exit the hole 15 and keep the fingers 50 centered within the hole 15.

Preferably, the operation of the tool is as follows:

Three grapple devices 16 are bolted to the existing lifting rig 82 by means of two bolts 98 passing through the base plate 94 and threadingly engaging holes within the lifting rig 82. The lifting rig 82 is lowered into position over the internals structure 10 by means of the plant's overhead crane (not shown). Alignment of the lifting rig 52 with the internals structure 10 is provided for by guide studs threaded into the reactor pressure vessel flange (not shown). In this manner the fingers 50 of each grapple device 16 will be generally centered over the holes 15 of the radial flange 12 on the internals structure 10. The lifting rig 82 is then lowered until the bottom surface of the lifting rig 82 contacts the top surface 13 of the radial flange 12 of the internals 10. The fingers 50, held in the retracted position 38 by the finger cup 66, will thereby pass through the threaded hole 15 in the flange 12. When the bottom of the internals lifting rig 82 is in contact with the top 13 of the flange 12, the fingers 50 of the device are designed and sized, in cooperation with the housing 18 and the lifting rig 82, such that the annular shoulder 32 on the lower end 24 of the fingers 50 will be positioned immediately below the bottom surface 14 of the internals structure flange 12. The ends of the pin or pins 103 on the upper end of the actuator rod 20 are then engaged by appropriate means and pushed downward such that the larger diameter near the bottom of the actuator rod 20 will contact the smaller second inner diameter 30 of the fingers 50 to thereby radially expand the fingers 50 outward. The fingers 50 will expand such that the smaller second outer diameter 44 above the annular shoulder 32 will be substantially in contact with the hole 15 of the radial flange 12. The guide vanes 80 in the finger cup 66 will ensure that the fingers 50 are centered within the hole 15. When the actuator rod 20 has been fully translated downward, in the example about 5 cm (2 in), the actuator rod 20 is then rotated about 60° in order to lock the pins 103 within the J-slots 102 of the housing 18. Since the spring 106 biases the actuator rod 20 upward, the pin ends will effectively be captured within the smaller vertical leg 110 of the J-slot 102 to prevent the actuator rod 20 from inadvertently being released, and the fingers 50 being retracted. A notch 112 in the smaller vertical leg 110 provides an even more secure locking arrangement when in the expanded position 46. After each grapple device 16 is similarly actuated, the internals structure 10 is then ready to be lifted and transported to the desired location.

When it is desired to remove the grapple devices 16 and lifting rig 82 from the internals structure 10, the fingers 50 are retracted by a reverse operation. Each actuator rod 20 is again fully translated downward by pushing down on the ends of pin 103, and rotating in the opposite direction (counter-clockwise in FIG. 6A) in order to align the pins 103 with the larger vertical leg of the J-slots 102. By way of the spring 96, the actuator rod 20 is then extended upward in order to disengage the larger diameter of the actuator rod 20 from the smaller second inner diameter 30 formed by the fingers 50. As the actuator rod 20 is translated upward, the finger cup 66 secured to the shaft 61 at the bottom of the actuator rod 20 will also translate upward and the radially outward directed taper 78 on the inside upper surface of the finger cup 66 will engage the conical tapering 76 of the fingers 50 and will readily slide thereon. The finger cup 66 provides a positive release mechanism that will ensure that the smaller second inner diameter 30 of fingers 50 will be fully collapsed about the shaft 61 and thereby retracted. Also the guide vanes 80 secured to the finger cup 66 act as guide studs upon retraction to center the fingers in the hole 15. With this configuration, full retraction of the expander member 22 is assured such that the annular shoulder 32 will not hang up on the bearing surface on the bottom 14 of the internals structure radial flange 12. When the fingers 50 of each grapple device 16 have thus been retracted, the associated lifting rig 82 can then be lifted out of engagement with the internals structure 10 via the overhead crane.

It should be understood that it is not essential that the grapple device be used in conjunction with the existing lifting rig. Such a configuration is convenient, however, due to the existence of the lifting rig and a method of operation which will be compatible with conventional methods. For example, each grapple device may be a separate element secured to each individual hole of a structure to be lifted (see FIG. 7). After the appropriate number of grapple devices are secured to the structure, they can then be lifted in unison by means of a common lifting device; one example of such being a nuclear power plant overhead crane adapted to engage the individual grapple devices. Also an individual grapple device can be used either to lift other structures, or merely to act as a securement device to any opening within a wall having opposite surfaces. Thus the grapple device, alone or in combination with similar grapple devices, has a variety of uses which would be readily apparent to one skilled in the art and not necessary to be individually listed herein.

While specific embodiments of the invention have been described in detail, it will be appreciated by those skilled in the art that various modifications and alterations would be developed in light of the overall teachings of the disclosure. Accordingly, particular arrangements disclosed are meant to be illustrative only and not limiting as to the scope of the invention, which is to be given the full breadth of the appended claims and in any and all equivalents thereof.

What is claimed is:

1. A through-hole grapple device for securement to a structure having a pair of surfaces and a hole therebetween, the grapple device having a retracted position and an expanded position and being comprised of:
   (i) a plurality of circumferentially disposed fingers each having a first inner arc segment on one end and a second inner arc segment at the opposite end with a tapered transition zone therebetween, and a first outer arc segment adjacent the tapered transition zone and a second outer arc segment adjacent the first inner arc segment, said first inner and outer arc segments being formed with respect to a first axis, and said second inner and outer arc segments being formed with respect to a second axis offset from the first by a predetermined distance and parallel thereto so that said first and second outer arc segments are not concentric with respect to each other, whereby said fingers cooperate to provide a first inner diameter formed by said first inner arc segments, a second inner diameter formed by said second inner arc segments, an annular shoulder having a first outer diameter smaller than that of the hole when in the retracted position and having a top surface with an outer boundary being formed by said first outer arc segments, a second outer diameter formed by said second outer arc segment and forming an inner boundary of the annular should and
   (ii) actuating means engaging said fingers to radially expand said fingers such that the second outer diameter thereof is expanded to be essentially equal to the diameter of the hole and the first outer diameter is substantially greater than the diameter of the hole so that the top surface of the annular shoulder is in abutting contact with one surface of the structure for securement thereto.

2. The through-hole grapple device as recited in claim 1, wherein the predetermined offset distance is essentially equal to the amount of radial expansion of said fingers.

3. The through-hole grapple device of claim 1, wherein the radius of the first inner arc segment is greater than that of the second inner arc segment, whereas the radius of the second outer arc segment is at least as great as that of the first outer arc segment, the radius of the second outer arc segment being essentially equal to that of the hole.

4. The through-hole grapple device as recited in claim 1, wherein the actuating means includes a locking means to lock said fingers in the expanded position.

5. The through-hole grapple device as recited in claim 4, wherein the actuating means comprises an actuator rod concentric with the first inner diameter, and a shaft attached to an end thereof so as to be concentric with the second inner diameter having a diameter essentially equal thereto when in the retracted position; the shaft and actuator rod having a second tapered transition zone therebetween disposed to cooperate with the tapered transition zone of said fingers when in the retracted position.

6. The through-hole grapple device as recited in claim 5, wherein the predetermined offset distance is essentially equal to the difference in radius between the actuator rod and the shaft.

7. A through-hole grapple device for lifting structures having at least a top and bottom surface with a hole therebetween, said grapple device comprising:
   a generally vertically disposed cylindrical housing which includes a collar on the lower end thereof, a tubular spacer extending downward from the collar and a base plate secured to the spacer, the baseplate and collar each having an opening therethrough; and
   a grapple assembly having its upper end disposed within said housing and passing through said openings, the grapple assembly comprising:
   (i) an actuator rod; and
   (ii) a plurality of grapple fingers circumferentially disposed about the actuator rod, said grapple fingers each having a first inner arc segment on the one end thereof nearer the housing and a second inner arc segment at the opposite end with a tapered transition zone therebetween, and a first outer arc segment adjacent the tapered transition zone and a second outer arc segment adjacent the first inner arc segment, said first inner and outer arc segments being formed with respect to a first axis and said second inner and outer arc segments being formed with respect to a second axis offset from the first axis by a predetermined distance and parallel thereto so that said first and second outer arc segments are not concentric with respect to each other, whereby said grapple fingers provide a first inner diameter formed by said first inner arc segments, a second inner diameter formed by said second inner arc segments, an annular shoulder having a first outer diameter smaller than that of the hole when in the retracted position and having a top surface with an outer boundary being formed by said first outer arc segments, a second outer diameter formed by said second outer arc segments and forming an inner boundary of the annular shoulder wherein the device is expanded by translation of the actuator rod so that it contacts the second inner diameter thereby radially expanding said grapple fingers into the expanded position in such a manner that the second outer diameter thereof is expanded to be essentially equal to the diameter of the hole and the first outer diameter is substantially greater than the hole so that the top surface of the annular shoulder is in abutting contact with one of said surfaces of the structure for securement thereto.

8. The through-hole grapple device as recited in claim 7 wherein the predetermined offset distance is no greater than the amount of radial expansion of said grapple fingers.

9. The through-hole grapple device as recited in claim 7, wherein the radius of the first inner arc segment is greater than that of the second inner arc segment, whereas the radius of the second outer arc segment is at least equal to that of the first outer arc segment, the radius of the second outer arc segment being essentially equal to that of the hole.

10. The through-hole grapple device as recited in claim 9, wherein the radius of the second outer arc segment is greater than that of the first outer arc segment by an amount essentially equal to the difference between said first and second inner arc segments.

11. The through-hole grapple device as recited in claim 9, wherein the predetermined offset distance is essentially equal to the amount of radial expansion of said grapple fingers.

12. The through-hole grapple device as recited in claim 11, wherein the actuator rod includes a locking means cooperatively associated with the housing to lock said grapple fingers of said grapple device in the expanded position.

13. The through-hole grapple device as recited in claim 12, wherein the actuator rod includes a shaft attached to an end thereof so as to be concentric with the second inner diameter of the expander member formed by said grapple fingers and having a diameter essentially equal thereto when in the retracted position, the shaft and actuator rod having a second tapered transition zone therebetween disposed so as to cooperate with the tapered transition zone of said grapple fingers when in the retracted position.

14. The through-hole grapple device as recited in claim 13, wherein the outer end of said grapple fingers axially adjacent to the annular shoulder is tapered downwardly, radially inwardly to form a conical end portion.

15. The through-hole grapple device as recited in claim 14, wherein the shaft has secured to its other end opposite the second transition zone a finger cup having a generally cylindrical wall portion with an outside diameter equal to that of the first outer diameter of the annular shoulder and a base, the finger cup disposed so as to hold said grapple fingers in the retracted position and to provide for passage of the grapple assembly through the hole of the structure to be secured.

16. The through-hole grapple device as recited in claim 15, wherein the outside diameter of the wall portion of the finger cup is somewhat smaller than the diameter of the hole, so that the first outer diameter of said grapple fingers is constricted in order to facilitate insertion of the device through the hole.

17. The through-hole grapple device as recited in claim 16, wherein the inside surface of the upper portion of the finger cup has a radially outwardly directed taper conforming to the conical end portion of said grapple fingers to facilitate sliding engagement therebetween when expanding and retracting said finger segments.

18. The through-hole grapple device as recited in claim 17, wherein the base of the finger cup has a bevelled outer surface to facilitate insertion through the hole.

19. The through-hole grapple device as recited in claim 12, wherein the cylindrical body of the housing includes at least one J-slot in the upper end thereof.

20. The through-hole grapple device as recited in claim 19, wherein the locking means is comprised of pin means secured to the upper end of the actuator rod disposed within the housing, the pin means being perpendicularly disposed with respect to the actuator rod and adapted to be slidably disposed within said J-slot.

21. The through-hole grapple device as recited in claim 20, wherein the locking means is comprised of two J-slots disposed in opposite sides of the housing and a pin secured to the upper end of the actuator rod so the ends thereof are slidably engaged within a respective J-slot.

22. The through-hole grapple device as recited in claim 9, wherein the upper end of each grapple finger disposed within the housing further includes an outwardly directed radial flange thereon adapted to be disposed within the annular space between the collar and the top surface of the structure to be lifted.

23. The through-hole grapple device as recited in claim 22, wherein the structure to be lifted is an internals structure of a nuclear reactor, the internals structure including a radial flange thereon having a top and bottom surface and at least one hole therethrough for receiving the grapple device.

24. An improved reactor internals lifting rig including a reactor internals through-hole grapple device for lifting and transporting an internals structure of a nuclear reactor, the internals structure including a radial flange thereon having a top and bottom surface with a plurality of holes therebetween, said internals through-hole grapple device comprising:
a generally vertically disposed cylindrical housing adapted to be secured to the lifting rig;
a generally vertically oriented grapple assembly having its upper end partially disposed within the housing and the lower and projecting substantially below the housing and the lifting rig, the lower end of the grapple assembly having an outwardly directed annular shoulder with an upper surface thereon which is adapted to pass through one of said holes and adjacent to the bottom surface of the radial flange, the grapple assembly having a retracted position and an expanded position wherein when in the retracted position the annular shoulder is smaller in diameter than said hole and when in the expanded position the annular shoulder is larger in diameter than said hole such that the upper surface of the annular shoulder is in abutting contact with the bottom surface of the radial flange of the internals structure, wherein the grapple assembly further comprises:
(i) a plurality of circumferentially disposed fingers each having a first inner arc segment on one end and a second inner arc segment at the opposite end with a tapered transition zone therebetween, and a first outer arc segment adjacent the tapered transition zone and a second outer arc segment adjacent the first inner arc segment, said first inner and outer arc segments being formed with respect to a first axis, and said second inner and outer arc segments being formed with respect to a second axis offset from the first by a predetermined distance and parallel thereto so that said first and second outer arc segments are not concentric with respect to each other, whereby said fingers cooperate to provide a first inner diameter formed by said first inner arc segments, a second inner diameter formed by said second inner arc segments, the annular shoulder having a first outer diameter smaller than that of the hole when in the retracted position and having a top surface with an outer boundary being formed by said first outer arc segments, a second outer diameter formed by said second outer arc segments and forming an inner boundary of the annular shoulder; and
(ii) actuating means engaging said fingers to radially expand said fingers into abutting contact with the bottom surface of the radial flange.

25. The improved reactor internals lifting rig as recited in claim 24, wherein the predetermined offset distance is no greater than the amount of radial expansion of the expander member.

26. The improved reactor internals lifting rig as recited in claim 25, wherein the radius of the first inner arc segment is greater than that of the second inner arc segment, whereas the radius of the second outer arc segment is greater than that of the first outer arc segment by an essentially equal amount, the radius of the second outer arc segment being essentially equal to that of the hole.

27. The improved reactor internals lifting rig as recited in claim 26, wherein the first outer diameter is concentric with the hole when in the retracted position, whereas the second outer diameter is concentric with the hole when in the expanded position.

28. The improved reactor internals lifting rig as recited in claim 27, wherein the radius of the second outer arc segment is greater than that of the first outer arc segment by an amount essentially equal to the difference between said first and second inner arc segments.

29. The improved reactor internals lifting rig as recited in claim 27, wherein said expanding means includes a locking means to lock said fingers of the in the expanded position.

30. The improved reactor internals lifting rig as recited in claim 29, wherein said expanding means comprises: a vertically oriented actuator rod having an outer diameter essentially equal to the first inner diameter of said fingers and being generally concentric therewith, a shaft attached to the lower end thereof so as to be generally concentric with the second inner diameter of said fingers with a diameter essentially equal thereto when in the retracted position, the shaft and actuator rod having a second tapered transition zone therebetween disposed to cooperate with the tapered transition zone of said fingers when in the retracted position.

31. The improved reactor internals lifting rig as recited in claim 30, wherein the outer end of said fingers disposed below the annular shoulder is tapered radially inwardly to form a conical end portion.

32. The improved reactor internals lifting rig as recited in claim 31, wherein the shaft has secured to its bottom end opposite the second tapered transition zone a finger cup having a generally cylindrical wall portion with an outside diameter no greater than that of the first outer diameter of the annular shoulder and a base, the finger cup disposed so as to hold said fingers of the grapple assembly in the retracted position and to provide for passage of said fingers through the hole of the internals structure.

33. The improved reactor internals lifting rig as recited in claim 32, wherein the grapple assembly is comprised of three individual grapple fingers.

34. The improved reactor internals lifting rig as recited in claim 33, wherein the finger cup includes three vertically disposed guide vanes secured thereto, said guide vanes radially oriented at about 120° with respect to each other such that said guide vanes are positioned between said individual fingers and extending upward from the base of the finger cup to an axial location substantially above the annular shoulder when in the retracted position such that when the actuator rod, shaft and finger cup are translated downward to expand said fingers said guide vanes do not exit from the hole.

35. The improved reactor internals lifting rig as recited in claim 34, wherein the housing is adapted to be secured to the internals lifting rig in order to lift the reactor internals structure further comprises:
a generally cylindrical body having a top end and a bottom end;
a collar secured to the bottom end and having a first opening therethrough;
a tubular spacer secured to the collar opposite the housing; and a base plate secured to the spacer opposite the collar, the base plate having a second opening therethrough and adapted to be secured to the lifting rig to thereby define an annular space between the collar and the lifting rig.

36. The improved reactor internals lifting rig as recited in claim 35, wherein the upper end of said fingers of the grapple assembly disposed within the housing includes an outwardly directed annular flange situated within the annular space in such a manner that the bottom face of the annular flange is in contact with the upper surface of the lifting rig.

37. The improved reactor internals lifting rig as recited in claim 36, wherein the body of the housing includes two oppositely oriented J-slot in the top end thereof.

38. The improved reactor internals lifting rig as recited in claim 37, wherein the locking means is comprised of pin means, secured to the upper end of the actuator rod disposed within the body of the housing, the pin means being perpendicularly disposed with respect to the actuator rod and adapted to be slidably engaged within said J-slots.

39. The improved reactor internals lifting rig as recited in claim 38, wherein said pin means is comprised of a pin secured to the upper end of the actuator rod so that the opposite ends thereof are slidably engaged within a respective J-slot.

40. The improved reactor internals lifting rig as recited in claim 39, wherein the locking means further includes a flange secured to the actuator rod at an axial location adjacent to the pin, and a spring secured between the flange and the collar to thereby bias the pin and the actuator rod upward with respect to the collar wherein the device is biased in the retracted position when the pin slidingly engages the larger leg of said J-slots and is locked into the expanded position when the pin slidingly engages the smaller leg of said J-slots.

41. The improved reactor internals lifting rig as recited in claim 40, wherein said predetermined offset distance is essentially equal to the amount of radial expansion of the expander member.

* * * * *